Figure 1:
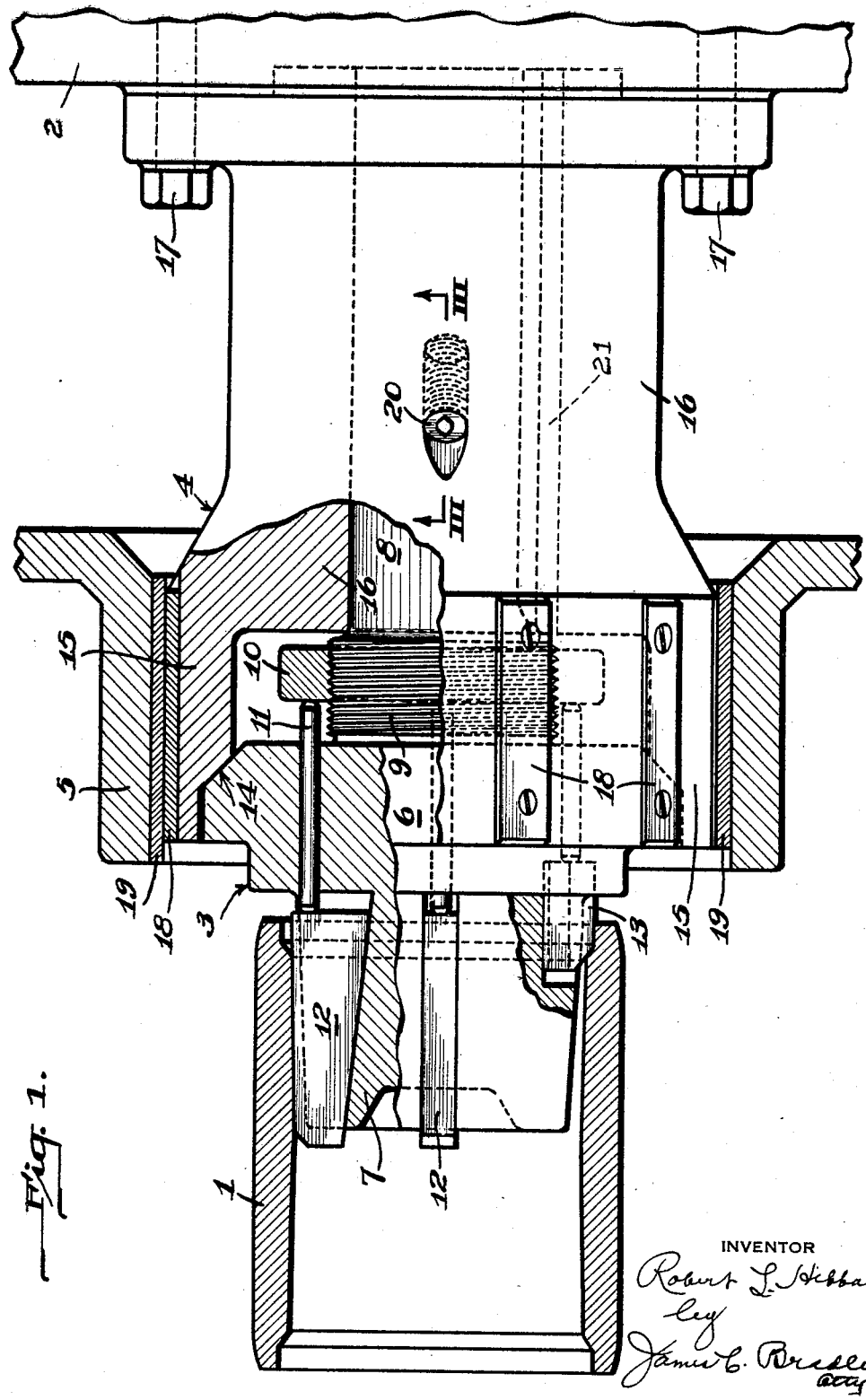

June 7, 1932.  R. L. HIBBARD  1,861,498
BORING HEAD
Filed March 16, 1931  2 Sheets-Sheet 1

INVENTOR
Robert L. Hibbard
by
James E. Bradley
atty

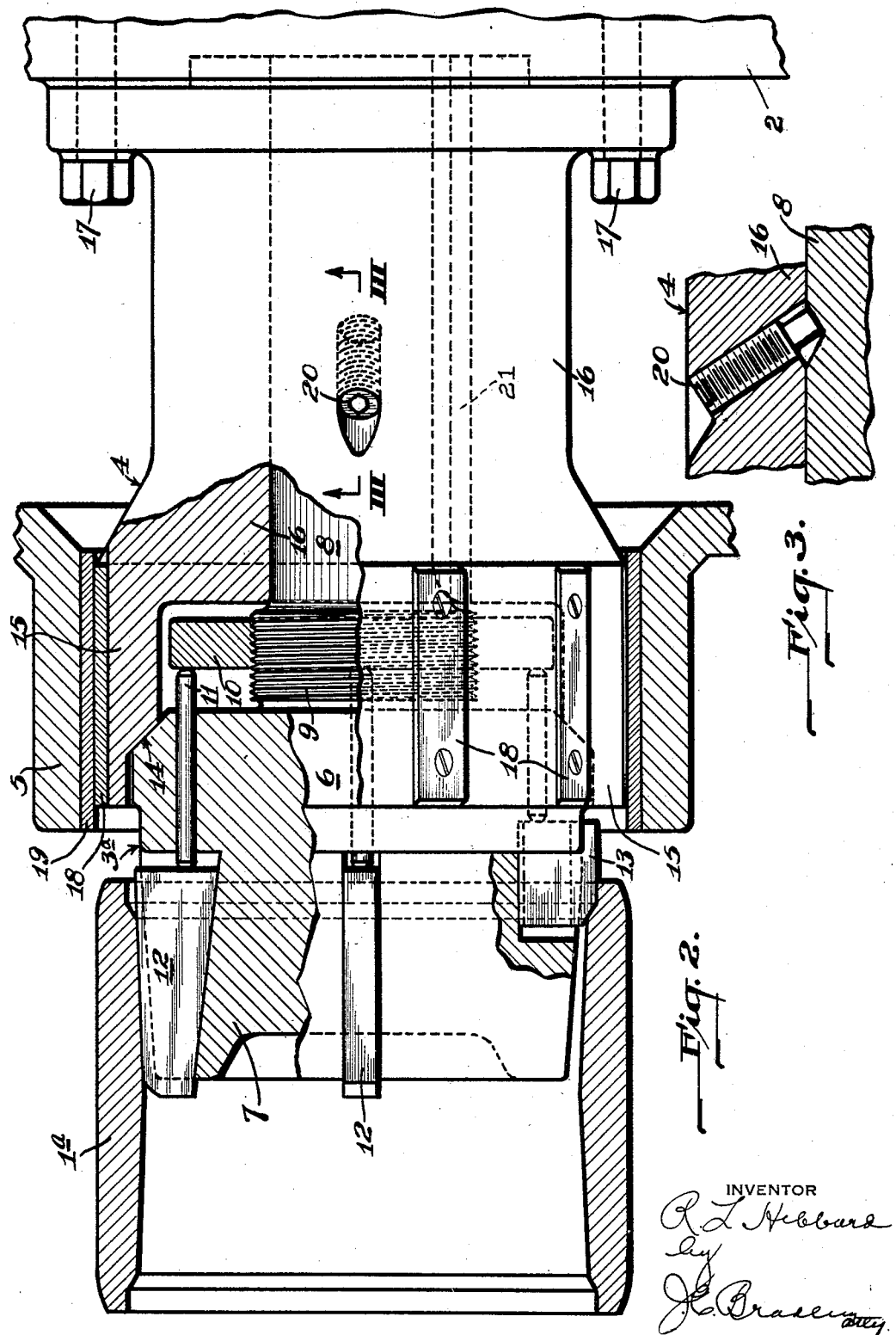

UNITED STATES PATENT OFFICE

ROBERT L. HIBBARD, OF BELLEVUE, PENNSYLVANIA, ASSIGNOR OF ONE-HALF TO WILLIAM K. STAMETS, OF PITTSBURGH, PENNSYLVANIA

BORING HEAD

Application filed March 16, 1931. Serial No. 522,857.

The invention relates to boring, reaming, or threading tools for machining couplings or the like, one form of machine with which the present tool is designed to be used being shown in my Patent No. 1,788,193. More particularly, the improvement relates to the construction for steadying the tool during the cutting operation and preventing vibration. Heretofore, this has been accomplished by the use of a guide sleeve rigidly supported relatively close to the rotating article being machined and adapted to receive a pilot member just back of the cutting dies of the tool. The addition of the pilot member to each tool involves a large expense over and above the cost of such tools without the pilot member, and the primary object of the present invention is to construct the tools and pilot member so that one pilot member can be used with any one of a large number of tools. In carrying out the improvement, the pilot member or adapter is secured to the carriage of the machine, and the tools are mounted releasably in the pilot member so as to be centered thereby and readily interchangeable. The cost of the pilot member is thus divided among a large number of tools. One embodiment of the invention is illustrated in the accompanying drawings, wherein:

Figure 1 is a side elevation, partly in section, showing the tool in position of use with respect to the carriage on which it is mounted and in engagement with the coupling being machined. Fig. 2 is a similar view showing the same pilot member as in Fig. 1, but with a boring tool of a different size. And Fig. 3 is a detail section on the line III—III of Figs. 2 and 3.

Referring to Fig. 1 of the drawings, 1 is a coupling which, it will be understood, is clamped in a suitable rotating chuck; 2 is a carriage mounted for reciprocation toward and from the chuck which carries the coupling, 3 is the machine tool which, in this case, is a boring or reaming tool; 4 is the adapter or pilot member adapted to center and support any one of a large number of tools which may differ widely as to size and character; and 5 is the guide sleeve which is mounted in fixed position on the frame of the machine adjacent the chuck which carries the coupling and is adapted to receive and steady the pilot member.

The tool 3 includes a body portion 6, an end portion 7 which is grooved to receive the cutting tools, and a shank 8. The body portion is threaded as indicated at 9 and carries a ring 10, by means of which the cutters are adjusted through the intermediary of the rods 11 extending slidably through the body portion 6. The bottoms of the cutters and the grooves carrying them are inclined in the usual manner. The particular tool shown has four cutters 12 and two cutters 13, but this is merely illustrative, and any number and kind of cutters may be used.

The body portion of the tool is provided with an annular inclined surface 14 adapted to engage a similar surface on the adapter or pilot member, such surfaces serving to center the tool with respect to the pilot member. The pilot member comprises the sleeve 15 and the hollow shank 16 secured rigidly to the carriage 2 by means of the bolts 17.

The sleeve 15 of the pilot member is provided with hardened strips 18 which are ground to an accurate fit in the guide sleeve 5, such sleeve being preferably provided with a wear sleeve 19.

The shank 8 of the tool has an accurate fit in the hollow shank 16 of the pilot member. In order to secure the shank 8 in position, a screw 20 is threaded through the wall of the shank 16 with its end in engagement with the shank 8, as indicated in Fig. 3. The screw is placed at the angle shown, so that when it is tightened, it tends to move the tool endwise and force the inclined surface 14 against the inclined surface of the pilot member, thus centering the tool and holding it against movement in any direction with respect to the pilot member. The key 21 serves to prevent rotation of the shank 8 in the member 16.

Fig. 2 illustrates the construction with a tool 3a which is identical with that of Fig. 1, except that it is much larger for boring out a large coupling 1a. The shank of the tool is the same as that of the tool of Fig. 1 and the portion carrying the inclined centering surface 14 is the same in diameter as in Fig. 1, so that the same adapter or pilot member can be used with both constructions. This is true with respect to the other tools (of which there may be a large number) designed to be used with the machine, so that only one pilot member is required. The tools are readily interchanged by loosening the screw 20, which permits of the withdrawal of the tool forwardly and the insertion of another tool which is in turn secured in place by tightening the screw 20. Corresponding parts are numbered as in Fig. 1.

In operation, the carriage 4 moves forward to the position shown in Figs. 1 and 2, at which time the cutters 12 and 13 engage the interior of the coupling and the sleeve 15 of the pilot member telescopes into the guide sleeve 5. The sleeve 15 is thus supported against lateral movement, and in turn supports the body portion 6 of the tool. This support is continued during the machining operation, after which, withdrawing the tool from the coupling preliminary to a further cutting operation.

What I claim is:

1. In combination in a machine tool, a steadying sleeve rigidly mounted adjacent the work, a cutting tool comprising a cutter head provided with cutters, a shank and a centering flange intermediate the cutter head and shank provided on its rear side with a conical surface lying at an angle approximately 45 degrees to the center line of the cutter, a pilot member comprising a cylindrical shank into which the shank of the tool is adapted to fit snugly having means at its rear end for securing it to a reciprocating carriage, and having a guide sleeve on its interior with a conical surface in opposition to said conical surface on said flange adapted to fit over the flange, said guide sleeve being formed on its exterior to fit slidingly into the steadying sleeve, and cooperating means between the pilot member for forcing said conical surfaces into tight contact and securing the cutting tool against movement with respect to the pilot member.

2. In combination in a machine tool, a steadying sleeve rigidly mounted adjacent the work, a cutting tool comprising a head provided with cutters, a conical surface to the rear thereof whose axis of generation is coincident with the center line of the cutter head and a shank to the rear of said conical surface, a pilot member adapted to be attached to the reciprocating carriage of the machine in which the tool is used, said pilot member being fixed against rotation and having at its forward end a guide whose exterior is adapted to fit inside said steadying sleeve when said carriage is advanced and whose interior has a conical surface adapted to engage the first mentioned conical surface, and means carried by the pilot member and engaging the tool shank for drawing the cutter head into said guide so that the conical surfaces are brought into tight engagement, said conical surfaces lying at a relatively abrupt angle to the center line of the cutter head so that said engaging conical surfaces offer no frictional resistance to the removal of the cutting tool from the pilot member.

In testimony whereof, I have hereunto subscribed my name this 12th day of March, 1931.

ROBERT L. HIBBARD.